United States Patent
Kim et al.

(10) Patent No.: US 11,996,729 B2
(45) Date of Patent: May 28, 2024

(54) AUXILIARY POWER SUPPLY INCLUDING CAPACITOR ARRAY AND METHOD OF OPERATING THE SAME

(71) Applicant: SK hynix Inc., Gyeonggi-do (KR)

(72) Inventors: Tae Hoon Kim, Gyeonggi-do (KR); Jae Woong Jeong, Gyeonggi-do (KR); Rak Hun Choi, Gyeonggi-do (KR); Eun Kyu Choi, Gyeonggi-do (KR); Tae Seung Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 110 days.

(21) Appl. No.: 17/461,673

(22) Filed: Aug. 30, 2021

(65) Prior Publication Data

US 2022/0285974 A1   Sep. 8, 2022

(30) Foreign Application Priority Data

Mar. 8, 2021   (KR) .................. 10-2021-0030310

(51) Int. Cl.
   *H02J 9/06*   (2006.01)
   *H02J 7/00*   (2006.01)
   *H02J 7/34*   (2006.01)

(52) U.S. Cl.
   CPC .............. *H02J 9/06* (2013.01); *H02J 7/0068* (2013.01); *H02J 7/345* (2013.01)

(58) Field of Classification Search
   CPC ............ H02J 9/06; H02J 7/0068; H02J 7/345
   USPC ..................................... 307/18, 64
   See application file for complete search history.

(56) References Cited

U.S. PATENT DOCUMENTS

| | | | | |
|---|---|---|---|---|
| 2012/0099392 A1* | 4/2012 | Shim | ...... | G11C 5/147 365/226 |
| 2015/0268709 A1* | 9/2015 | Morning-Smith | ..... | G01R 31/64 307/64 |
| 2021/0231720 A1* | 7/2021 | Butler | .................. | G11C 29/021 |

FOREIGN PATENT DOCUMENTS

| | | |
|---|---|---|
| KR | 1020150141239 A | 12/2015 |
| KR | 1020190062032 A | 6/2019 |

OTHER PUBLICATIONS

Teverovsky, A., Anomalous Transients in Chip Polymer Tantalum Capacitors, NASA/GFSC, Space Passive Component Days (SPCD), Oct. 9-12, 2018, 15 pages, Greenbelt, MD, USA.

Zhou, J. et al., The temperature-dependent microstructure of PEDOT/PSS films: Insights from morphological, mechanical and electrical analyses, The Royal Society of Chemistry, J. Mater. Chem. C, 2014, 9 pages, 2(46):9903.

Lewis, J., Considerations for Polymer Capacitors in Extreme Environments, Electronic Components KEMET Corporation, 2013, 2 pages.

* cited by examiner

*Primary Examiner* — Michael R. Fin
(74) *Attorney, Agent, or Firm* — IP&T GROUP LLP

(57) ABSTRACT

The present technology includes a power supply and a method of operating the same. The power supply includes a main power supply configured to receive external power and output a charge voltage and main power, and an auxiliary power supply including a capacitor array configured to charge auxiliary power using the charge voltage and output the auxiliary power. The auxiliary power supply is configured to periodically repeat a discharge operation and a sub charge operation on the capacitor array when the charging of the capacitor array is started.

19 Claims, 13 Drawing Sheets

AUXILIARY POWER SUPPLY INCLUDING CAPACITOR ARRAY AND METHOD OF OPERATING THE SAME

CROSS-REFERENCE TO RELATED APPLICATION

The present application claims priority under 35 U.S.C. § 119(a) to Korean patent application number 10-2021-0030310 filed on Mar. 8, 2021, the entire disclosure of which is incorporated by reference herein.

BACKGROUND

Field of Invention

The present disclosure relates to a power supply and a method of operating the same, and more particularly, to a power supply including an auxiliary power supply and a method of operating the same.

Description of Related Art

A memory system may include a memory device in which data is stored, a controller that controls the memory device, and a power supply (power device) that supplies power to the controller and the memory device.

The power supply may include a main power supply configured to receive external power and supply internal power to the controller and the memory device, and an auxiliary power supply configured to supply auxiliary power when the main power supply may not output the internal power. For example, when supply of the external power is temporarily stopped, the auxiliary power supply may temporarily supply the auxiliary power to the controller and the memory device.

Since the auxiliary power supply is required to supply the auxiliary power when the supply of the external power is stopped, the auxiliary power supply may include a plurality of capacitors configured to charge the external power when the external power is supplied.

The capacitors may be formed in a structure including a dielectric between two electrodes. According to a type of the dielectric, the capacitors may be classified into an air capacitor, a vacuum capacitor, a gas capacitor, a liquid capacitor, a mica capacitor, a ceramic capacitor, a paper capacitor, a plastic film capacitor, an electrolytic capacitor, and the like.

SUMMARY

An embodiment of the present disclosure provides a power supply capable of improving a charge speed of a capacitor array in an auxiliary power supply, and a method of operating the same.

According to an embodiment of the present disclosure, a power supply includes a main power supply configured to receive external power and output a charge voltage and main power, and an auxiliary power supply including a capacitor array configured to charge auxiliary power and output the auxiliary power. The auxiliary power supply is configured to periodically repeat a discharge operation and a sub charge operation on the capacitor array when the charging of the capacitor array is started.

According to an embodiment of the present disclosure, a power supply includes a main power supply configured to receive external power and output a charge voltage and main power, and an auxiliary power supply including a capacitor array configured to charge auxiliary power and output the auxiliary power. The auxiliary power supply is configured to check a detection voltage charged in the capacitor array until a charging level of the capacitor array reaches a target level and periodically repeat a discharge operation and a sub charge operation on the capacitor array.

According to an embodiment of the present disclosure, a method of operating a power supply includes supplying a charge voltage to a capacitor array through a charge line, and periodically performing a monitoring operation on the charge line while a charging level of the capacitor array is increased to a target level. The monitoring operation includes decreasing a voltage of the charge line, and charging the charge line.

Since the present technology may quickly charge the auxiliary power supply, data stored in a memory system may be protected by using the auxiliary power when the supply of the external power is temporarily stopped.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification.

Figure 1:
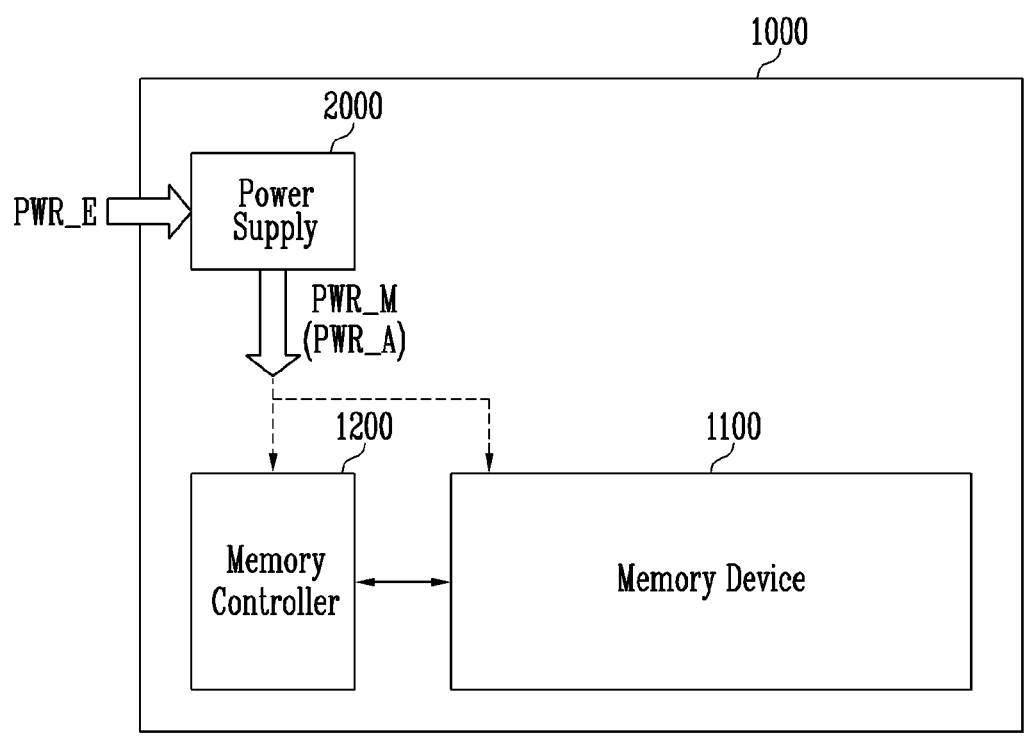
FIG. 1 is a diagram illustrating a memory system according to an embodiment of the present disclosure.

FIG. 1 is a diagram illustrating a memory system according to an embodiment of the present disclosure.

Referring to FIG. 1, the memory system 1000 may include a memory device 1100, a memory controller 1200, and a power supply 2000.

The memory device 1100 may be configured to store data. For example, the memory device 1100 may be configured as a nonvolatile memory device or a volatile memory device.

The memory controller 1200 may be configured to communicate between a host and the memory device 1100. For example, when a request output from the host is received, the memory controller 1200 may be configured to control the memory device 1100 according to the received request.

The power supply 2000 may be configured to receive external power PWR_E from an external device and supply main power PWR_M or auxiliary power PWR_A to the memory controller 1200 and the memory device 1100. The external device supplying the external power PWR_E may be the host that transfers the request to the memory controller 1200 or a power supply that supplies only the external power PWR_E regardless of the host.

When the external power PWR_E is received, the power supply 2000 may output the main power PWR_M. When supply of the external power PWR_E is abnormally stopped, the power supply 2000 may output the auxiliary power PWR_A because the main power PWR_M may not be output. The main power PWR_M may be a voltage used for the memory controller 1200 and the memory device 1100 to perform a normal operation (for example, a program, read, or erase operation). The auxiliary power PWR_A may be a voltage temporarily supplied to the memory controller 1200 and the memory device 1100 so that the memory controller 1200 and the memory device 1100 may stably store data when the supply of the main power PWR_M is temporarily stopped. For example, the power supply 2000 may charge the auxiliary power PWR_A while the external power PWR_E is received and outputs the main power PWR_M, and may output the auxiliary power PWR_A instead of the main power PWR_M when the supply of the external power PWR_E is abnormally stopped. Since the auxiliary power PWR_A is a voltage charged in the power supply 2000, the auxiliary power PWR_A may be temporarily used only for a safe storage operation of the memory controller 1200 and the memory device 1100 when the supply of the external power PWR_E is interrupted.

Figure 2:
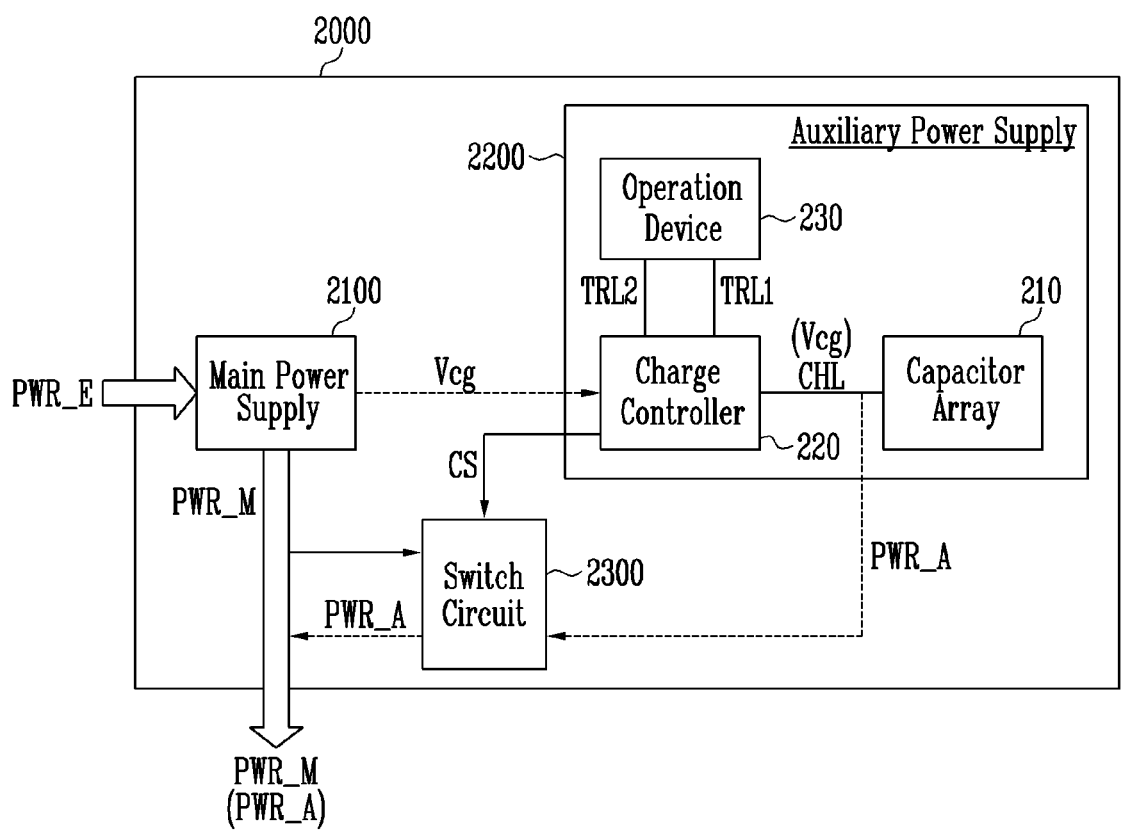
FIG. 2 is a diagram illustrating a power supply according to an embodiment of the present disclosure.

FIG. 2 is a diagram illustrating a power supply according to an embodiment of the present disclosure.

Referring to FIG. 2, the power supply 2000 may include a main power supply 2100, an auxiliary power supply 2200, and a switch circuit 2300.

The main power supply 2100 may receive the external power PWR_E, convert the external power PWR_E into the main power PWR_M, and output the main power PWR_M. For example, the main power supply 2100 may be configured to convert a voltage level of the external power PWR_E according to a voltage level used in the memory system 1000 of FIG. 1, and output the converted voltage as the main power PWR_M.

The auxiliary power supply 2200 may be configured to charge a voltage of the auxiliary power supply 2200 using a charge voltage Vcg when the charge voltage Vcg is supplied from the main power supply 2100. The auxiliary power supply 2200 may output the charged voltage as the auxiliary power PWR_A. The auxiliary power supply 2200 may be configured to output a charge completion signal CS when the charged voltage of the auxiliary power supply 2200 is charged to a level of a target voltage.

The switch circuit 2300 may be configured to monitor a level of the main power PWR_M output from the main power supply 2100, and output the auxiliary power PWR_A instead of the main power PWR_M when an output of the main power PWR_M is stopped or the level is rapidly decreased. For example, the switch circuit 2300 may output the auxiliary power PWR_A instead of the main power PWR_M after receiving a charge completion signal CS. Since the auxiliary power PWR_A is not sufficiently charged to the target voltage until the charge completion signal CS is received, in a state in which the charge completion signal CS is deactivated, the switch circuit 2300 does not output the auxiliary power PWR_A even though supply of the main power PWR_M is stopped.

The auxiliary power supply 2200 is more specifically described as follows.

The auxiliary power supply 2200 may include a capacitor array 210, a charge controller 220, and an operation device 230 (i.e., a processor).

The capacitor array 210 may be configured to charge a voltage of the capacitor array 210 using the charge voltage Vcg supplied through a charge line CHL. The capacitor array 210 may output the charged voltage as the auxiliary power PWR_A.

When the charge voltage Vcg is supplied from the main power supply 2100, the charge controller 220 may transfer the charge voltage Vcg to the capacitor array 210 through the charge line CHL. The charge controller 220 may detect the charged voltage (i.e., a detected voltage Vcgd) of the capacitor array 210 through the charge line CHL. The charge controller 220 may transfer the detected voltage Vcgd through a first transfer line TRL1 or a second transfer line TRL2 to the operation device 230 while the charging operation is progressed. The charge line CHL is coupled to the capacitor array 210 and thus the detected voltage Vcgd may represent an amount of power charged in the capacitor array 210. The charging operation of charging the capacitor array 210 using the charge voltage Vcg and the detection operation of detecting the detected voltage Vcgd may be alternately and repeatedly performed.

For example, while the charge is progressed in the capacitor array 210, the charge controller 220 may periodically check the detected voltage Vcgd of the capacitor array 210 detected through the charge line CHL and transfer the detected voltage Vcgd to the operation device 230 through the first transfer line TL1. In addition, when a charging rate (i.e., a charging level) of the capacitor array 210 is increased to a target rate (i.e., a target level) while the charging operation is progressed, the charge controller 220 may transfer the detected voltage Vcgd detected from the charge line CHL to the operation device 230 through the second transfer line TRL2. That is, when the charge of the capacitor array 210 is started, the charge controller 220 may independently perform a monitoring operation for increasing a charge speed of the capacitor array 210 and a main charge check operation for checking whether the charge of the capacitor array 210 is completed. Since the monitoring operation and the main charge check operation are independently performed from each other, the charge controller 220 may include a counter for the monitoring operation and a counter for the main charge check operation, respectively.

The operation device 230 may convert the detected voltage Vcgd received through the first or second transfer line TRL1 or TRL2 into a digital value, compares the digital value with a reference value and outputs a result of the comparison to charge controller 220 through the first or second transfer line TRL1 or TRL2.

For example, during the monitoring operation, the operation device 230 may compare the digital value of the detected voltage Vcgd received through the first transfer line TRL1 with the reference value, and output the result of the comparison to the charge controller 220. When the digital value of the detected voltage Vcgd received through the first transfer line TRL1 is greater than or equal to the reference value, the operation device 230 may output a monitoring completion signal having a logic high value. When the digital value is less than the reference value, the operation device 230 may output a monitoring completion signal having a logic low value. That is, the operation device 230 may deactivate the monitoring completion signal when the charge of the capacitor array 210 is not completed and activate the monitoring completion signal when the charge of the capacitor array 210 is completed.

During the main charge check operation, the operation device 230 may compare the digital value of the detected voltage Vcgd received through the second transfer line TRL2 with the reference value and output a result of the comparison to the charge controller 220. The reference values used in the monitoring operation and the main charge check operation may be set identically to each other. When the digital value of the detected voltage Vcgd received through the second transfer line TRL2 is greater than or equal to the reference value, the operation device 230 may output a check completion signal having a logic high value. When the digital value is less than the reference value, the operation device 230 may output a check completion signal having a logic low value. That is, the operation device 230 may deactivate the check completion signal when the charge of the capacitor array 210 is not completed and activate the check completion signal when the charge of the capacitor array 210 is completed.

During the monitoring operation, the charge controller 220 may check the detected voltage Vcgd of the charge line CHL every predetermined period while the monitoring completion signal MTC (see FIG. 4) having the logic low value is received and end the monitoring operation when the monitoring completion signal MTC having the logic high value is received. The charge controller 220 may process the monitoring operation as a fail when the monitoring completion signal MTC having the logic high value is not received within a second set amount of time 2Tset (see FIG. 7) during the monitoring operation.

The charge controller 220 may output a charge completion signal CS having a logic high value when the check completion signal PGS (see FIG. 4) having the logic high value is received within a third set amount of time 3Tset (see FIG. 7) during the main charge check operation. The charge controller 220 may output a charge completion signal CS having a logic low value and process the main charge check operation as a fail when the check completion signal PGS having the logic high value is not received within the third set amount of time 3Tset during the main charge check operation.

Figure 3:
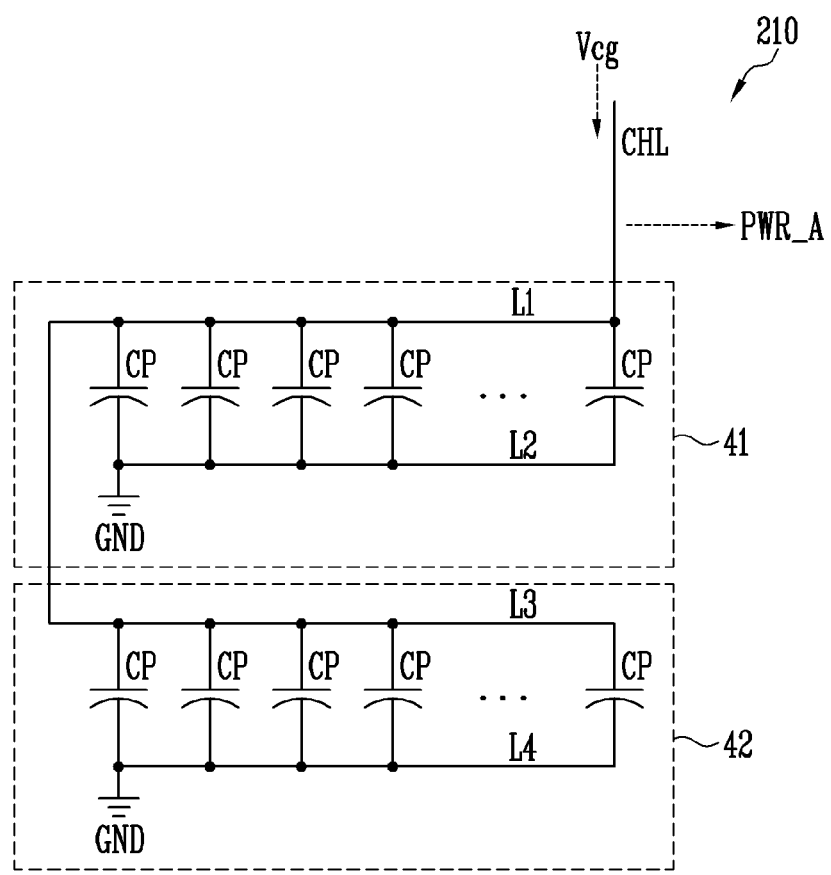
FIG. 3 is a diagram illustrating a capacitor array shown in FIG. 2.

FIG. 3 is a diagram illustrating the capacitor array 210 shown in FIG. 2 according to an embodiment of the present disclosure.

Referring to FIG. 3, the capacitor array 210 may include first and second capacitor groups 41 and 42 capable of charge the charge voltage Vcg supplied through the charge line CHL. Although the first and second capacitor groups 41 and 42 are shown in FIG. 3, the number of capacitor groups is not limited to the number disclosed in the drawing.

The first and second capacitor groups 41 and 42 may be configured identically to each other, and may be connected in parallel between the charge line CHL and a ground terminal GND. For example, the first capacitor group 41 may include a plurality of capacitors CP connected in parallel between a first line L1 and a second line L2. The first line L1 may be connected to the charge line CHL, and the second line L2 may be connected to the ground terminal GND. The plurality of capacitors CP may include two electrodes and a dielectric inserted between the electrodes. For example, the plurality of capacitors may be configured of an air capacitor, a vacuum capacitor, a gas capacitor, a liquid capacitor, a mica capacitor, a ceramic capacitor, a paper capacitor, a plastic film capacitor, or an electrolytic capacitor according to a type of the dielectric. Among them, the electrolytic capacitor may include a polymer-tantalum capacitor. The polymer-tantalum capacitor may refer to a capacitor of which the dielectric is formed of tantalum, and may be mainly used to charge a high-capacity voltage. A charge speed of the plurality of capacitors may be affected by a temperature. For example, as the temperature is increased, the charge speed may be increased. The second capacitor group 42 may include a plurality of capacitors CP connected in parallel between a third line L3 and a fourth line L4. The third line L3 may be connected to the charge line CHL through the first line L1 and the fourth line L4 may be connected to the ground terminal GND. The plurality of capacitors CP included in the second capacitor group 42 may be formed in the same structure as the plurality of capacitors CP included in the first capacitor group 41.

Figure 4:
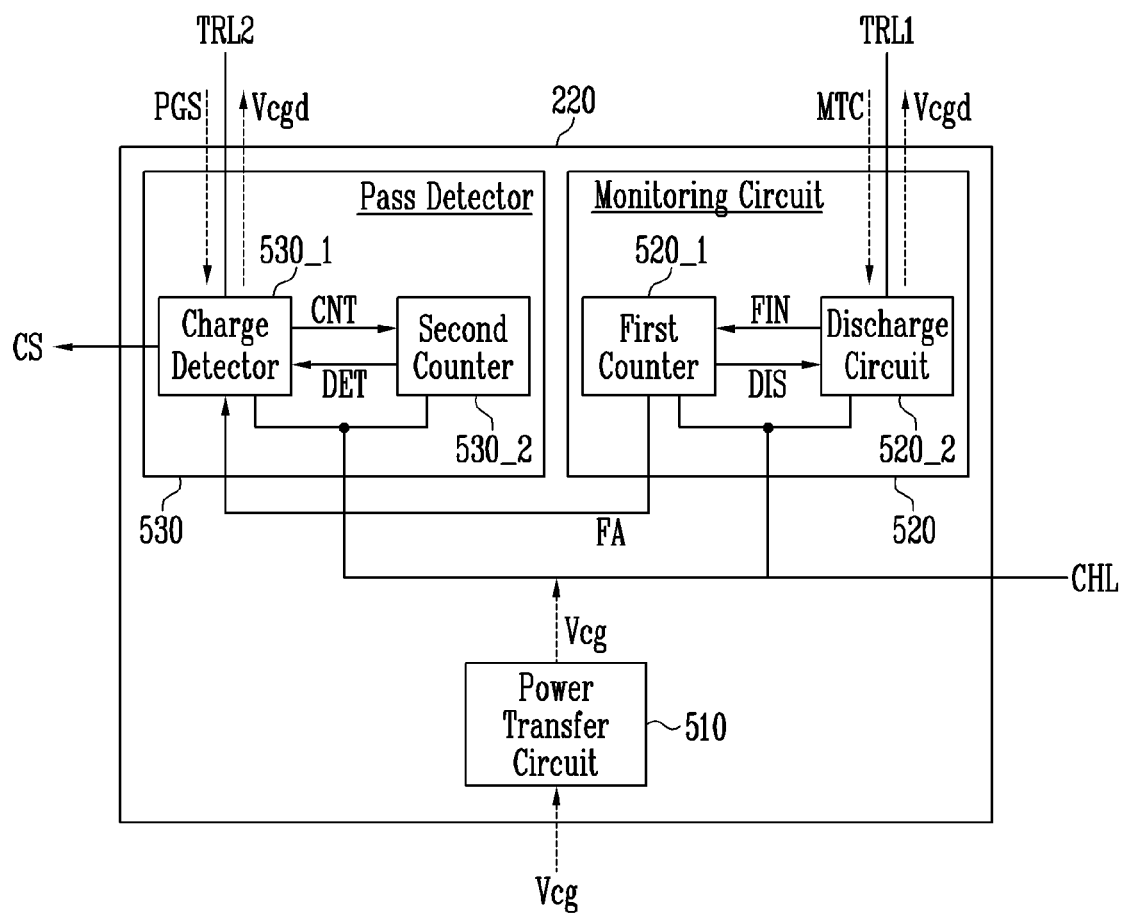
FIG. 4 is a diagram illustrating a charge controller shown in FIG. 2 according to an embodiment of the present disclosure.

FIG. 4 is a diagram illustrating the charge controller 220 shown in FIG. 2 according to an embodiment of the present disclosure.

Referring to FIG. 4, the charge controller 220 may include a power transfer circuit 510, a monitoring circuit 520, and a pass detector 530.

The power transfer circuit 510 may be configured to receive the charge voltage Vcg output from the main power supply 2100 of FIG. 2 and transfer the charge voltage Vcg to the charge line CHL, which is coupled to the capacitor array 210.

The monitoring circuit 520 may be configured to monitor a level of a voltage on the charge line CHL. The monitoring circuit 520 may include a first counter 520_1 and a discharge circuit 520_2.

The first counter 520_1 may be configured to count an amount of time during the monitoring operation to output a discharge signal DIS every predetermined period while a count end signal FIN having a logic low level is received and may not output the discharge signal DIS when the count end signal FIN having a logic high level is received. For example, the first counter 520_1 may start a count operation when the charge voltage Vcg of a positive voltage is applied to the charge line CHL, and output the discharge signal DIS every predetermined period after the count operation is started. The first counter 520_1 may be configured to output the discharge signal DIS from the start of the count operation or may be configured to output the discharge signal DIS after a first set amount of time 1Tset (see FIG. 7) elapses from the start time of the count operation.

The discharge circuit 520_2 may discharge the charge line CHL (i.e., the capacitor array 210) in response to the discharge signal DIS being received every predetermined period, detect the detected voltage Vcgd and transfer to the first transfer line TRL1 the detected voltage Vcgd received from the charge line CHL after a preset time amount, during which the charge line CHL is discharged. In an embodiment, the discharge circuit 520_2 may alternately perform the discharge operation and the charging operation for the charge line CHL (i.e., the capacitor array 210) according to the discharge signal DIS. A time during which the discharging operation is performed may be much shorter than a time during which the charging operation is performed. For example, the time during which the discharging operation is performed may be 70 milliseconds, and the time during which the charging operation is performed may be 1 second. In an embodiment, the discharge circuit 520_2 may include at least one resistor. The discharge circuit 520_2 may use the at least one resistor to discharge the voltage of the capacitor array 210. Since the charge voltage Vcg is continuously supplied to the charge line CHL, even though the discharge circuit 520_2 discharges the charge line CHL, the voltage of the charge line CHL may not be rapidly decreased but may be temporarily decreased and increased again. The discharge circuit 520_2 may transfer the detected voltage Vcgd detected at a time point when the voltage of the charge line CHL begins to increase after the temporary decrease to the operation device 230 of FIG. 2 through the first transfer line TRL1. In addition, when the discharge circuit 520_2 receives the monitoring completion signal MTC having the logic low value from the operation device 230, the discharge circuit 520_2 may output the count end signal FIN having a logic low value. When the discharge circuit 520_2 receives the monitoring completion signal MTC having the logic high value, the discharge circuit 520_2 may output the count end signal FIN having a logic high value.

When the first counter 520_1 receives the count end signal FIN having the logic low value from the discharge circuit 520_2, the first counter 520_1 may output the discharge signal DIS every predetermined period, and when the first counter 520_1 receives the count end signal FIN having the logic high value, the first counter 520_1 may not output the discharge signal DIS. In addition, the first counter 520_1 may output a fail signal FA when the count end signal FIN having the logic high value is not received until a maximum charge time after the monitoring operation is started. The fail signal FA may be a signal indicating that the charge operation is failed, and may be transferred to the pass detector 530.

The pass detector 530 may be configured to check the detected voltage Vcgd of the charge line CHL when the charge voltage Vcg is supplied to the charge line CHL. The pass detector 530 may perform the check operation for determining whether the charge is normally progressed when the detected voltage Vcgd is increased to the target voltage (i.e., a sub target level). In an embodiment, the check operation may be an operation of discharging the voltage of the capacitor array 210 and checking the charged voltage of the capacitor array 210. In an embodiment, the check operation may be an operation of discharging the voltage of the capacitor array 210 and checking the magnitude of the capacitance of the capacitor array 210 using a time required for the voltage to decrease by a preset level (e.g., −5%). In order to perform the check operation, the pass detector 530 may include a charge detector 530_1 and a second counter 530_2.

The charge detector 530_1 may check the detected voltage Vcgd of the charge line CHL from when the charge voltage Vcg starts to be applied to the charge line CHL. For example, the charge detector 530_1 may perform the check operation for determining whether the detected voltage Vcgd detected through the charge line CHL is increased to the sub target level. The sub target level may be set to be lower than the target level (i.e., a final target level) of the auxiliary power. For example, the sub target level may be set to a voltage 5% to 15% lower than the final target level of the auxiliary power. The charge detector 530_1 may perform the check operation when it is determined that the detected voltage Vcgd is increased to the sub target level. The check operation may be performed in the same method as the discharge operation performed by the discharge circuit 520_2. The check operation may be performed only during a predetermined amount of time (e.g., a time amount between time points T2 and T3 of FIG. 10A) from when the detected voltage Vcgd reaches the sub target level. After the check operation is performed during the predetermined amount of time, the charge detector 530_1 may output the detected voltage Vcgd received from the charge line CHL through the second transfer line TRL2.

Subsequently, when the check completion signal PGS having the logic low value is received through the second transfer line TRL2, the charge detector 530_1 may determine that the capacitor array 210 of FIG. 2 is not sufficiently charged, and output a count signal CNT to the second counter 530_2.

When a detection signal DET having a logic high value is received from the second counter 530_2, the charge detector 530_1 may check the detected voltage Vcgd of the charge line CHL again. When a detection signal DET having a logic low value is received from the second counter 530_2, the charge detector 530_1 may determine the charge operation as an abnormal state and process the charge operation as a fail. For example, the charge detector 530_1 may output the charge completion signal CS having the logic low value in response to the detection signal DET having the logic low value. In addition, even though the fail signal FA is received, the charge detector 530_1 may output the charge completion signal CS having the logic low value.

The second counter 530_2 may be configured to compare a current amount of time and a third set amount of time 3Tset (see FIG. 7) to output the detection signal DET when the count signal CNT is received. The current amount of time refers to a time from start of the charge operation to the present, and the third set amount of time 3Tset refers to the maximum charge time. Therefore, the third set amount of time 3Tset may be stored in advance in the second counter 530_2. The second counter 530_2 may output a detection signal DET having the logic high value when the current amount of time is less than the third set amount of time 3Tset, and output a detection signal DET having the logic low value when the current amount of time is greater than or equal to the third set amount of time 3Tset.

Figure 5:
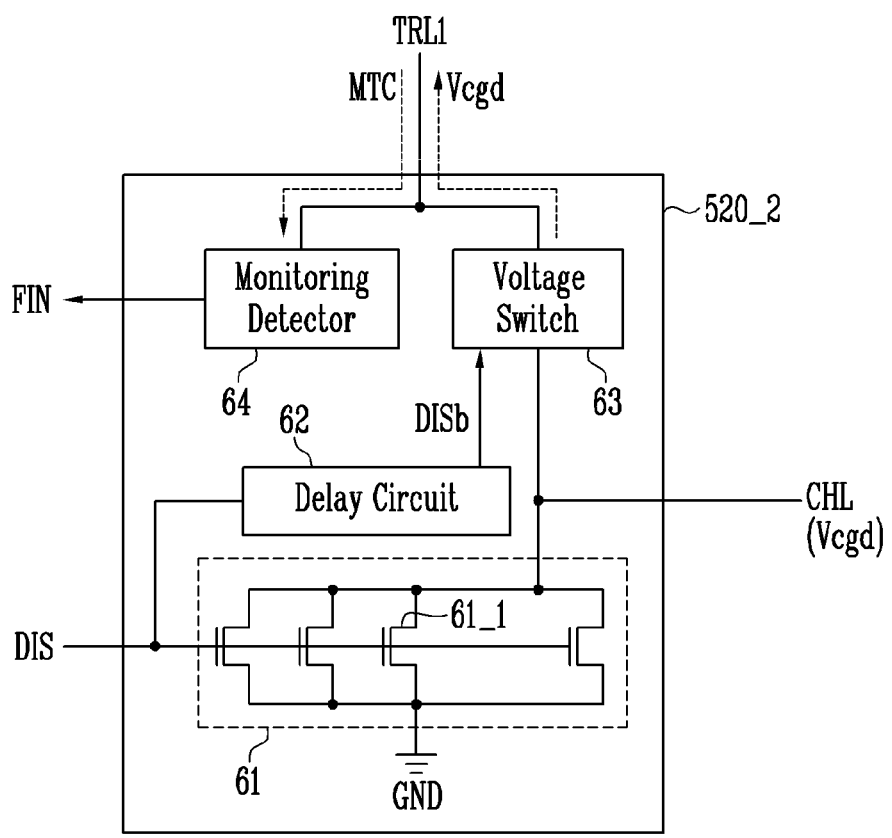
FIG. 5 is a diagram illustrating a discharge circuit shown in FIG. 4 according to an embodiment of the present disclosure.

FIG. 5 is a diagram illustrating the discharge circuit 520_2 shown in FIG. 4 according to an embodiment of the present disclosure.

Referring to FIG. 5, the discharge circuit 520_2 may include a discharge switch group 61, a delay circuit 62, a voltage switch 63, and a monitoring detector 64.

The discharge switch group 61 may include a plurality of discharge switches 61_1 connected in parallel between the charge line CHL and the ground terminal GND. The plurality of discharge switches 61_1 may be implemented with NMOS transistors that are turned on or turned off in response to the discharge signal DIS. For example, the plurality of discharge switches 61_1 may be turned on in response to the discharge signal DIS having a logic high value. When the plurality of discharge switches 61_1 are turned on, the voltage of the charge line CHL may be decreased as a current flows between the charge line CHL and the ground terminal GND. After the plurality of discharge switches 61_1 are turned on and the preset time amount is elapsed, when the discharge signal DIS having a logic low value is input, the plurality of discharge switches 61_1 may be turned off again.

The delay circuit 62 may be configured to output an inverted discharge signal DISb obtained by inverting the discharge signal DIS after a predetermined time delay, when the discharge signal DIS is input. Although not shown in the drawing, the delay circuit 62 may include an odd number of inverters.

The voltage switch 63 may transfer the detected voltage Vcgd of the charge line CHL to the first transfer line TRL1 in response to the inverted discharge signal DISb. For example, when the discharge signal DIS has a logic high level and thus the inverted discharge signal DISb having a logic low value is input to the voltage switch 63 during the discharge operation, the voltage switch 63 may block the charge line CHL and the first transfer line TRL1 from each other. Therefore, during the discharge operation, the charge line CHL may be discharged. When the discharge signal DIS has a logic low level and thus the inverted discharge signal DISb having a logic high value is input to the voltage switch 63 after the discharge operation is completed, the voltage switch 63 may connect the charge line CHL and the first transfer line TRL1 to each other. Therefore, after the discharge operation is completed, the charge line CHL may be charged again by the charge voltage Vcg and the detected voltage Vcgd may be provided through the first transfer line TRL1. A predetermined amount of time after the connection between the charge line CHL and the first transfer line TRL1, the voltage switch 63 may again block the charge line CHL and the first transfer line TRL1. When the voltage switch 63 outputs the detected voltage Vcgd to the first transfer line TRL1, the monitoring detector 64 sharing the first transfer line TRL1 does not receive the detected voltage Vcgd.

The monitoring detector 64 may be configured to output the count end signal FIN according to a logic value of the monitoring completion signal MTC when the monitoring completion signal MTC is input through the first transfer line TRL1. For example, when a monitoring completion signal MTC having a logic low value is input, the monitoring detector 64 may output the count end signal FIN having the logic low value, and when a monitoring completion signal MTC having a logic high value is input, the monitoring detector 64 may output the count end signal FIN having the logic high value. That is, when the detected voltage Vcgd is greater than the reference value, the monitoring completion signal MTC has the logic high value, which means that the charge of the capacitor array 210 of FIG. 2 is completed. Therefore, the monitoring detector 64 may output the count end signal FIN having the logic high value so that the first counter 520_1 of FIG. 4 may end the count operation.

Figure 6:
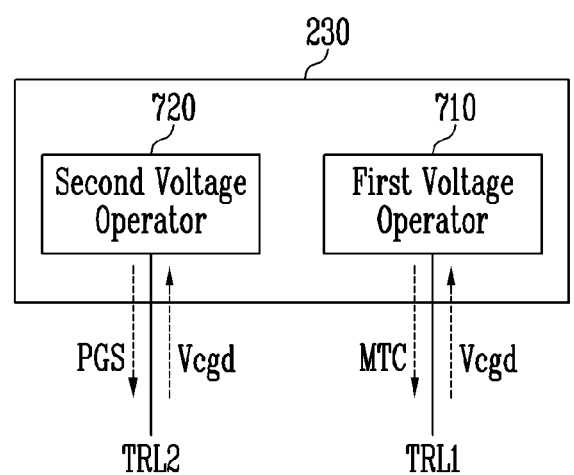
FIG. 6 is a diagram illustrating an operation device shown in FIG. 2 according to an embodiment of the present disclosure.

FIG. 6 is a diagram illustrating the operation device 230 shown in FIG. 2 according to an embodiment of the present disclosure.

Referring to FIG. 6, the operation device 230 may include a first voltage operator 710 and a second voltage operator 720.

The first voltage operator 710 may be configured to generate the digital value according to a level of the detected voltage Vcgd and perform an operation of comparing the digital value with the reference value when the detected voltage Vcgd is input through the first transfer line TRL1. The reference value may be preset in the first voltage operator 710 and may be a value corresponding to the sub target level of the detected voltage Vcgd. The sub target level may be set according to the final target level of the auxiliary power. For example, the reference value may be set to a value corresponding to the final target level of the auxiliary power or may be set to a value corresponding to a level 5% to 15% lower than the final target level. The first voltage operator 710 may output the monitoring completion signal MTC having the logic high value when the digital value of the detected voltage Vcgd is greater than or equal to the reference value, and output the monitoring completion signal MTC having the logic low value when the digital value is less than the reference value. That is, the first voltage operator may deactivate the monitoring completion signal MTC when the capacitor array 210 of FIG. 2 is not sufficiently charged, and activate the monitoring completion signal MTC when the capacitor array 210 is sufficiently charged.

When the detected voltage Vcgd is input through the second transfer line TRL2, the second voltage operator 720 may compare the digital value of the detected voltage Vcgd with the reference value, and output the result value according to the comparison result to the charge controller 220. The reference value may be preset in the second voltage operator 720 and may be the same as the reference value stored in the first voltage operator 710. The second voltage calculator 720 may output the check completion signal PGS having the logic high value when the digital value of the detected voltage Vcgd received through the second transfer line TRL2 is greater than or equal to the reference value, and output the check completion signal PGS having the logic low value when the digital value is less than the reference value. That is, the second voltage operator 720 may deactivate the check completion signal PGS when the capacitor array 210 of FIG. 2 is not sufficiently charged, and activate the check completion signal PGS when the capacitor array 210 is sufficiently charged.

Figure 7:
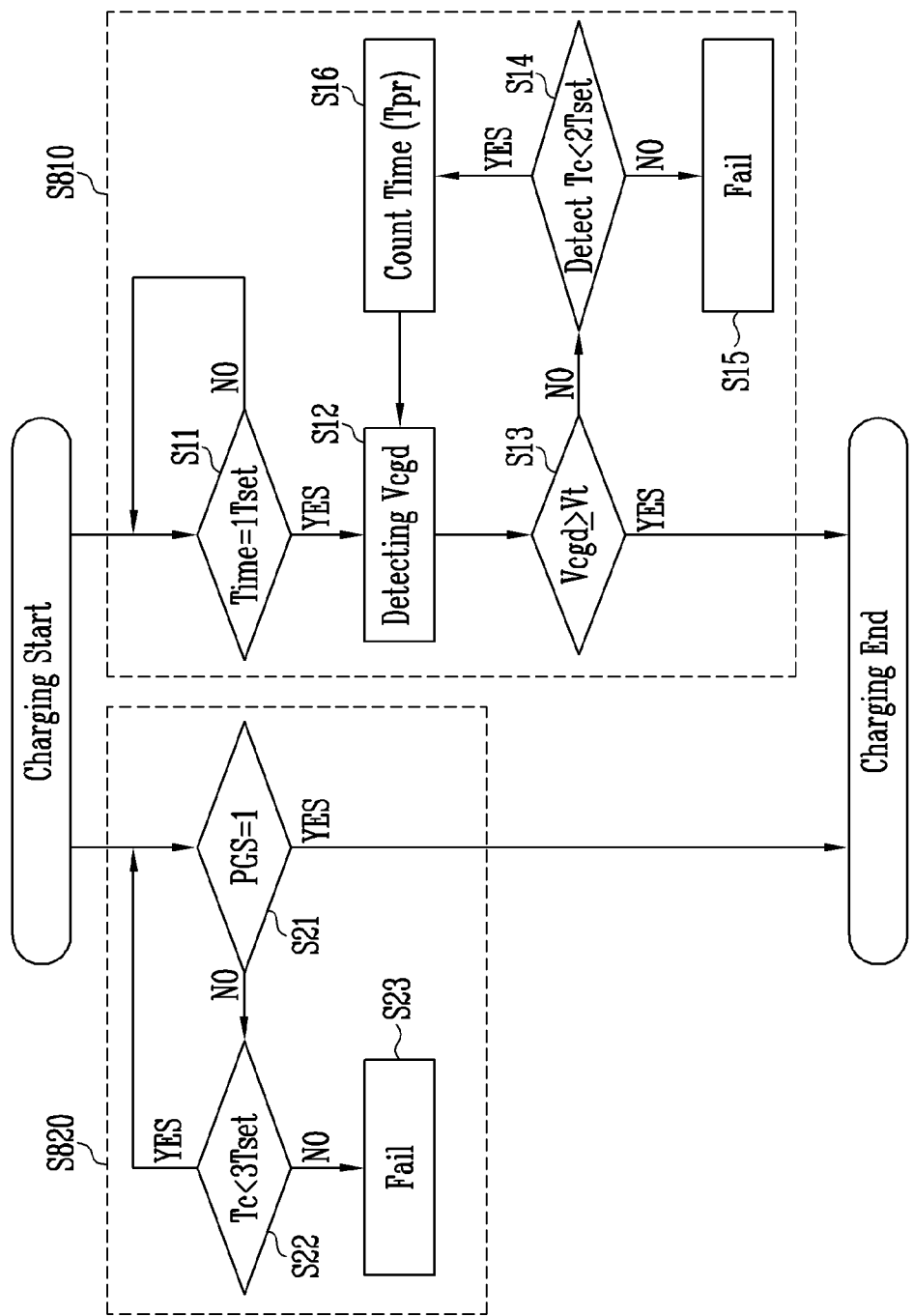
FIG. 7 is a flowchart illustrating a method of operating an auxiliary power supply according to an embodiment of the present disclosure.

FIG. 7 is a flowchart illustrating a method of operating an auxiliary power supply according to an embodiment of the present disclosure.

Referring to FIGS. 4 and 7, when the charge voltage Vcg is supplied to the auxiliary power supply and the charge is started, the auxiliary power supply may perform a monitoring operation S810 and a main charge check operation S820 independently from each other. The monitoring operation S810 is periodically performed at the beginning of the charge operation to increase the charge speed of the capacitor array 210 of FIG. 2, and the main charge check operation S820 is performed to check whether the capacitor array 210 of FIG. 2 is normally charged. When the charge voltage Vcg starts to be applied to the auxiliary power supply 2200 of FIG. 2, the charge operation may be started, and when the charge operation is started, the monitoring operation S810 and the main charge check operation S820 may be performed independently from each other. Each of the monitoring operation S810 and the main charge check operation S820 is described as follows.

When the monitoring operation S810 is started, an operation S11 of determining whether a first set amount of time 1Tset elapses after the charge operation is started may be performed. For example, the first counter 520_1 may count an amount of time from when the voltage starts to be supplied to the charge line CHL and compare the counted time and the first set amount of time 1Tset with each other. When the counted amount of time is different from the first set amount of time 1Tset (NO) as a result of the comparison, the first counter 520_1 may continue to count the time.

When the amount of time counted in operation S11 becomes the first set amount of time 1Tset (YES), an operation S12 of discharge the charge line CHL and detecting the detected voltage Vcgd may be performed by the discharge circuit 520_2. For example, in operation S12, the discharge operation in which the charge line CHL to which the charge voltage Vcg is supplied is temporarily discharged may be performed, and a sub charge operation in which the voltage level of the charge line CHL is increased again by the charge voltage Vcg after the discharge is ended may be performed. Subsequently, the detected voltage Vcgd of the charge line CHL on which the sub charge operation is performed may be detected. Alternatively, when operation S12 is started, the discharge operation may be performed after the sub charge operation in which the charge voltage Vcg is continuously supplied to the charge line CHL is performed. Since the discharge operation is completed within a predetermined time, the detected voltage Vcgd of the charge line CHL may be increased again by the charge voltage Vcg when the discharge operation is completed.

Subsequently, an operation S13 of comparing the level of the detected voltage Vcgd with the sub target level Vt may be performed by the first voltage operator 710. For example, when the level of the detected voltage Vcgd is lower than the sub target level Vt (NO), an operation S14 of comparing a current amount of time Tc with a second set amount of time 2Tset may be performed. The current amount of time Tc refers to an amount of time from the start of the charge operation to the present, and the second set amount of time 2Tset refers to a maximum charge time. That is, a case where the current amount of time Tc is equal to or greater than the second set amount of time 2Tset means that the charge operation is not normally progressed until the maximum charge time after the charge operation is started. For example, when a leakage occurs in some of devices that charge the auxiliary power, the charge operation may not be completed within the maximum charge time. Therefore, in this case, the charge operation may be processed as a fail (S15). That is, in operation S14, when the current amount of time Tc is greater than or equal to the second set amount of time 2Tset (NO), the charge operation may be processed as the fail (S15).

In operation S13, when the level of the detected voltage Vcgd is higher than or equal to the target level (YES), the charge operation may be ended.

In operation S14, when the current amount of time Tc is less than the second set amount of time 2Test (YES), an operation S16 of counting an amount of time to monitor the detected voltage Vcgd according to a predetermined period Tpr may be performed.

In operation S16, when an amount of time corresponding to the period Tpr is elapsed, operation S12 may be performed again. Operations S12 to S16 may be repeated until the level of the detected voltage Vcgd is higher than or equal to the sub target level Vt (YES) in operation S13.

When the level of the detected voltage Vcgd is higher than or equal to the sub target level Vt (YES) in operation S13, since the charge operation of the auxiliary power is completed, the charge operation may be ended.

The main charge check operation S820 is described as follows.

When the main charge check operation S820 is started, an operation S21 of determining whether the check completion signal PGS has a logic high value 1 may be performed when the charge operation is started. When the charging rate of the capacitor array 210 of FIG. 2 is increased to the target rate, the charge detector 530_1 may transfer the detected voltage Vcgd detected from the charge line CHL to the operation device 230 through the second transfer line TRL2. For example, when the main charge check operation S820 is started, the charge detector 530_1 may perform the check operation of checking the detected voltage Vcgd of the charge line CHL and temporarily decreasing the voltage level of the charge line CHL when the charging rate of the capacitor array 210 of FIG. 2 is increased to the target rate. The check operation may be performed in the same method as the discharge operation performed by the discharge circuit 520_2. The check operation may be performed during the predetermined amount of time (e.g., a time amount between time points T2 and T3 of FIG. 10A) from when the detected voltage Vcgd reaches the sub target level, and when the predetermined amount of time is elapsed, the charge detector 530_1 may output the detected voltage Vcgd of the charge line CHL through the second transfer line TRL2. Subsequently, it may be determined whether the check completion signal PGS having the logic high value 1 is received through the second transfer line TRL2.

In operation S21, when the check completion signal PGS has a logic low value 0 (NO), an operation S22 of comparing the current amount of time Tc with a third set amount of time 3Tset may be performed. The current amount of time Tc refers to the time from the start of the charge operation to the present, and the third set amount of time 3Tset refers to the maximum charge time. Therefore, the third set amount of time 3Tset may be set to the same time as the second set amount of time 2Tset.

When the current amount of time Tc is less than the third set amount of time 3Tset in operation S22 (YES), operation S21 may be performed again. When the check completion signal PGS has the logic high value 1 (YES) in operation S21, the charge operation may be ended.

In operation S22, when the current amount of time Tc is greater than or equal to the third set amount of time 3Tset (NO), the charge operation may be processed as a fail (S23).

Figure 8:
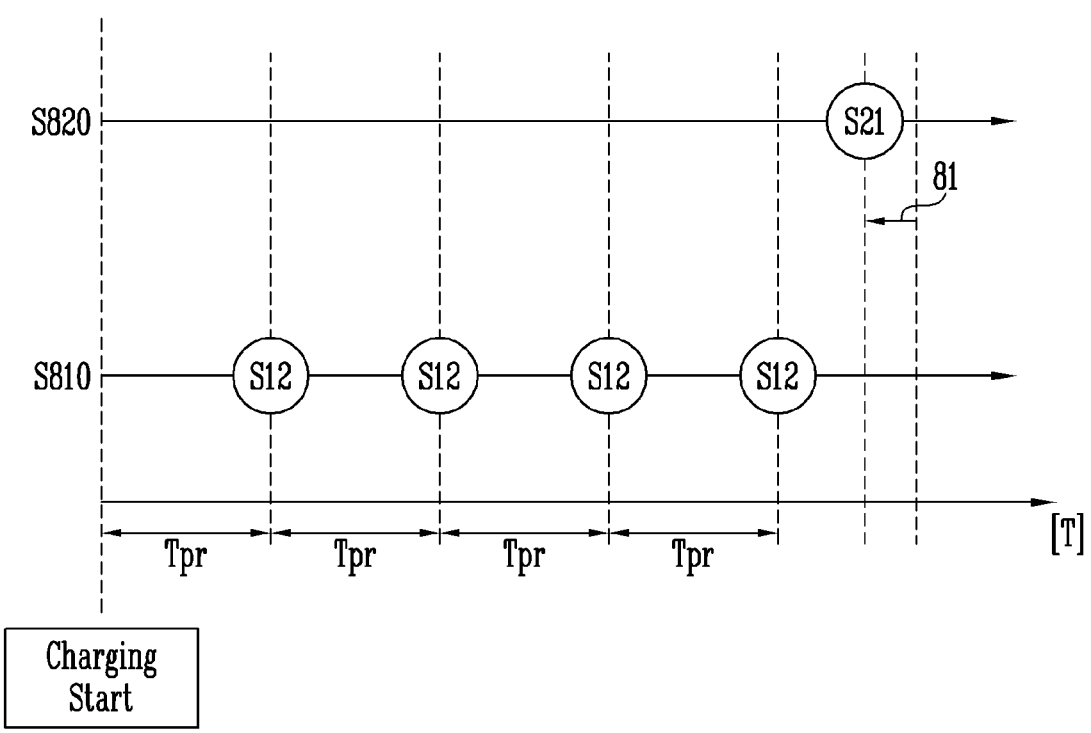
FIG. 8 is a diagram illustrating a monitoring operation and a main charge check operation by time according to an embodiment of the present disclosure.

FIG. 8 is a diagram illustrating the monitoring operation and the main charge check operation by time according to an embodiment of the present disclosure.

Referring to FIG. 8, when the charge operation is started (T1), the monitoring operation S810 and the main charge check operation S820 may be independently performed.

In the monitoring operation S810, operation S12 of FIG. 7 for detecting the detected voltage Vcgd of the charge line CHL of FIG. 4 may be performed every predetermined period Tpr. In the main charge check operation S820, while the monitoring operation S810 is performed, an operation of checking the voltage of the charge line CHL of FIG. 4 may be performed, and an operation S21 of FIG. 7 for determining the check completion signal may be quickly performed.

For example, since the charge and discharge operations are periodically repeated in the monitoring operation S810, the temperature of the capacitor array 210 of FIG. 2 may be gradually increased. As the temperature of the capacitor array 210 is increased, the charge speed of the capacitor array 210 may be increased, and thus a time required to complete the charge operation of the auxiliary power supply may be shortened (81).

Figure 9:
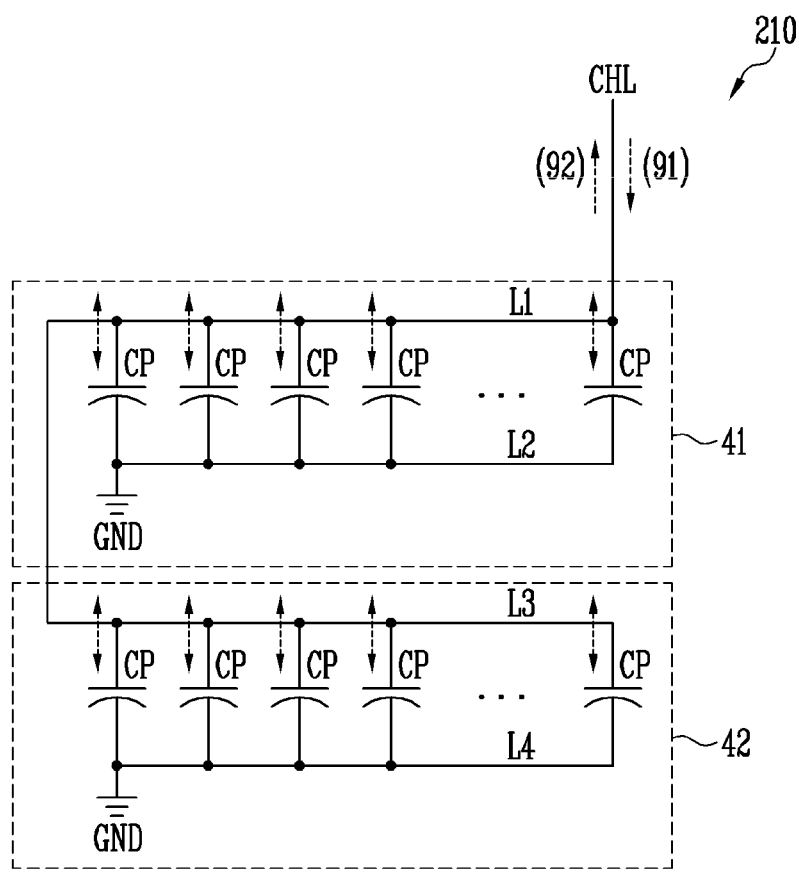
FIG. 9 is a diagram illustrating a principle in which a temperature of the capacitor array is increased according to an embodiment of the present disclosure.

FIG. 9 is a diagram illustrating a principle in which the temperature of the capacitor array is increased according to an embodiment of the present disclosure.

Referring to FIG. 9, the capacitor array 210 includes the plurality of capacitors CP. When the voltage is charged through the charge line CHL (91) and when the charge line CHL is discharged (92), a direction in which a current flows is different. Therefore, when the charge and discharge operations are periodically performed, since a direction in which a current flows in the plurality of capacitors CP is periodically changed, the temperature of the plurality of capacitors CP may also be increased periodically. Since the charge speed is also increased as the temperature of the plurality of capacitors CP is increased, a time required for the auxiliary power to be increased to the final target level may be shortened.

Figure 10A:
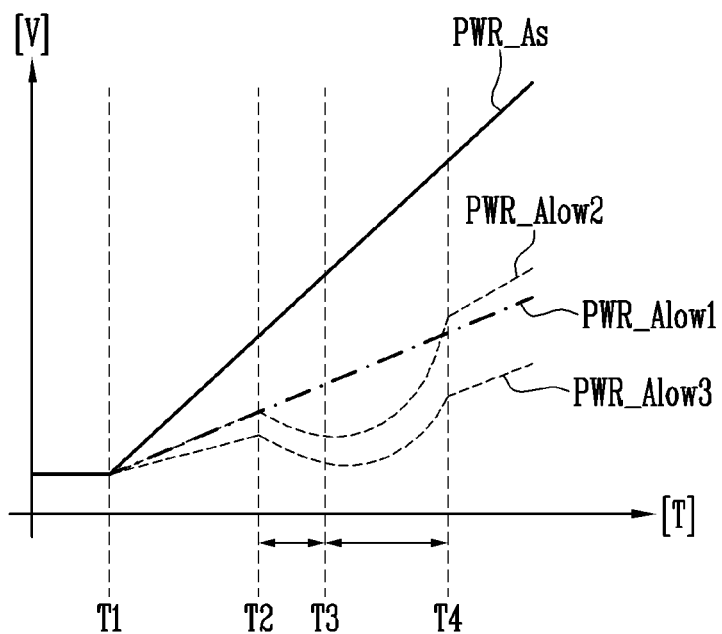
FIGS. 10A and 10B are diagrams illustrating a change of auxiliary power by temperature during the monitoring operation according to an embodiment of the present disclosure.
Figure 10B:
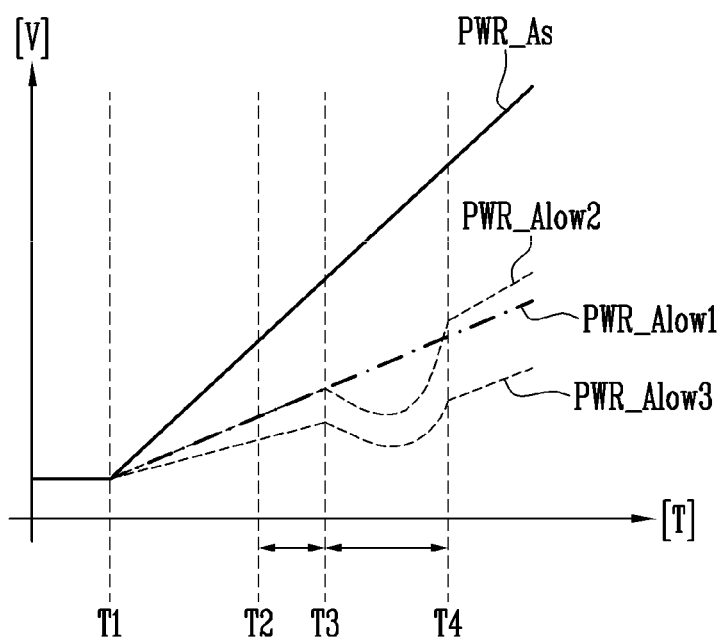

FIGS. 10A and 10B are diagrams illustrating a change of the auxiliary power by temperature during the monitoring operation according to an embodiment of the present disclosure.

Referring to FIG. 10A, a voltage charged in capacitors at a room temperature without the monitoring operation is referred to as room temperature auxiliary power PWR_As, and a voltage charged in the capacitors at a temperature lower than the room temperature is referred to as first low temperature auxiliary power PWR_Alow1. A voltage charged in the capacitors when a discharge operation T2 to T3 and a sub charge operation T3 to T4 according to the present embodiment are performed in a state in which the capacitor array 210 of FIG. 2 is normally configured without a leakage is referred to as second low temperature auxiliary power PWR_Alow2. Here, the sub charge operation T3-T4 is a term for distinguishing from the entire charge operation performed on the capacitor array 210 of FIG. 2, and refers to a charge operation performed immediately after the discharge operation in the monitoring operation. Therefore, in the sub charge operation, the charge operation may be continuously performed without time division. A voltage charged in the capacitors when the discharge operation T2 to T3 and the sub charge operation T3 to T4 according to the present embodiment are performed in a state in which a defect exists such as a leakage in the capacitor array 210 of FIG. 2 is referred to as third low temperature auxiliary power PWR_Alow3.

When the discharge operation T2 to T3 and the sub charge operation T3 to T4 according to the present embodiment are not performed, the first low temperature auxiliary power PWR_Alow1 may be increased slower than the room temperature auxiliary power PWR_As.

When the discharge operation T2 to T3 and the sub charge operation T3 to T4 according to the present embodiment are performed, the second low temperature auxiliary power PWR_Alow2 may be temporarily decreased while the discharge operation T2 to T3 is performed, when the sub charge operation T3-T4 is performed, the second low temperature auxiliary power PWR_Alow2 may be increased faster than the first low temperature auxiliary power PWR_Alow1. At this time, the direction of the current changes due to the discharge operation T2 to T3 and the sub charge operation T3 to T4, and the charge operation may be rapidly performed as the temperature increases.

When the discharge operation T2 to T3 and the sub charge operation T3 to T4 according to the present embodiment are performed, the third low temperature auxiliary power PWR_Alow3 may be increased slower than the first low temperature auxiliary power PWR_Alow1 from the start of charge operation (T1) due to the defect such as leakage. In the defective capacitor array, even though the temperature is increased, a level of the third auxiliary power PWR_Alow3 may be increased slower than the level of the first low temperature auxiliary power PWR_Alow1 due to a cause such as leakage. In such an auxiliary power supply, since the third low temperature auxiliary power PWR_Alow3 is not increased to the target voltage or is increased very slowly even though the third low temperature auxiliary power PWR_Alow3 is increased to the target voltage, the charge operation may be processed as a fail.

Referring to FIG. 10B, the sub charge operation may be performed prior to the discharge operation in a period T2 to T4. That is, in the embodiment described with reference to FIG. 10A, the sub charge operation is performed during the period T3 to T4 after the discharge operation is performed during the period T2 to T3, but in FIG. 10B, the discharge operation may be performed after the sub charge operation is performed. For example, the sub charge operation may be performed in the period T2-T3. The discharge operation may be performed and then the sub charge operation may be performed in the period T3-T4.

Figure 11:
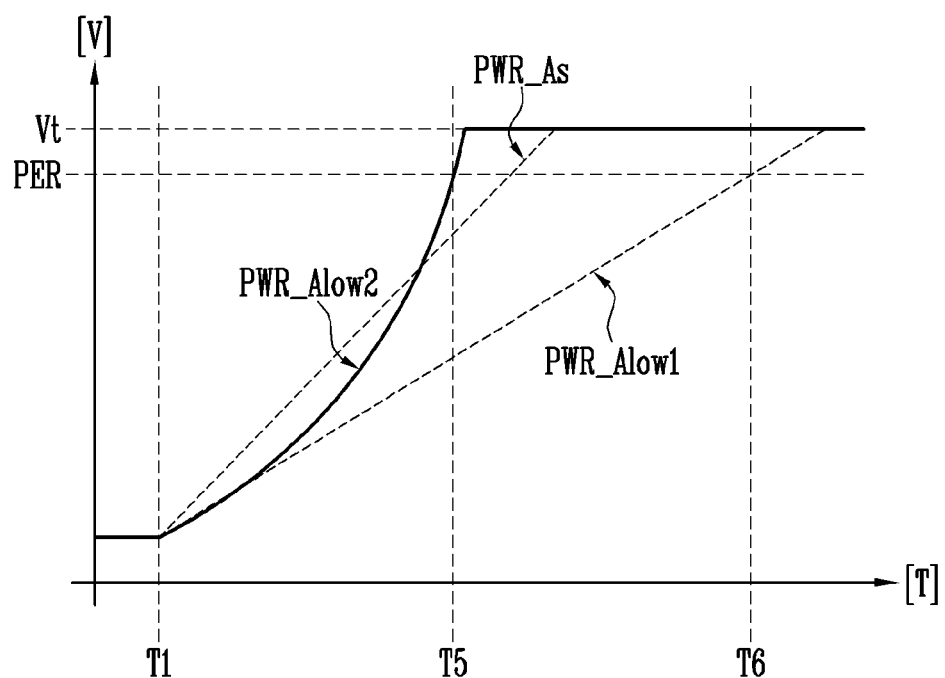
FIG. 11 is a diagram illustrating a charge speed of auxiliary power according to an embodiment of the present disclosure.

FIG. 11 is a diagram illustrating a charge speed of auxiliary power according to an embodiment of the present disclosure.

Referring to FIGS. 10 and 11, the first low temperature auxiliary power PWR_Alow1 is a voltage to which the monitoring operation S12 of FIG. 7 of the present embodiment is not applied, and the second low temperature auxiliary power PWR_Alow2 is a voltage to which the monitoring operation S12 of the present embodiment is applied. In a graph, a T axis indicates an increase of a time and a V axis indicates an increase of a voltage.

When the charge operation is started (T1), the first low temperature auxiliary power PWR_Alow1 may be increased at a speed slower than that of the room temperature auxiliary power PWR_As. However, when the monitoring operations S12 according to the present embodiment are applied, the charge speed may be gradually increased whenever the monitoring operations S21 are performed like the second low temperature auxiliary power PWR_Alow2. Therefore, the second low temperature auxiliary power PWR_Alow2 may reach a target rate PER faster than the room temperature auxiliary power PWR_As, and thus the charge operation may be quickly completed.

Figure 12:
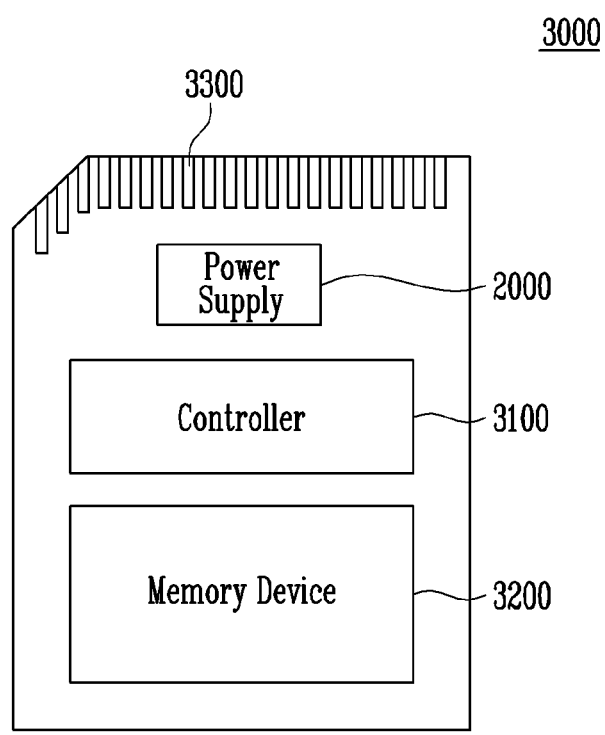
FIG. 12 is a diagram illustrating a memory card system to which a power supply according to an embodiment of the present disclosure is applied.

FIG. 12 is a diagram illustrating a memory card system 3000 to which a power supply according to an embodiment of the present disclosure is applied.

Referring to FIG. 12, the memory card system 3000 includes the power supply 2000, a controller 3100, a memory device 3200, and a connector 3300.

The power supply 2000 may be configured identically to the power supply 2000 shown in FIG. 2, and may supply the main power or the auxiliary power to the controller 3100 and the memory device 3200.

The controller 3100 is connected to the memory device 3200. The controller 3100 is configured to access the memory device 3200. For example, the controller 3100 may be configured to control a program, read, or erase operation of the memory device 3200 or control a background operation. The controller 3100 is configured to provide an interface between the memory device 3200 and a host. The controller 3100 is configured to drive firmware for controlling the memory device 3200. For example, the controller 3100 may include components such as a random access memory (RAM), a processor, a host interface, a memory interface, and an error corrector.

The controller 3100 may communicate with an external device through the connector 3300. The controller 3100 may communicate with an external device (for example, the host) according to a specific communication standard. For example, the controller 3100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards or interfaces described above.

For example, the memory device 3200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

The controller 3100 and the memory device 3200 may be integrated into one semiconductor device to configure a memory card. For example, the controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (e.g., MMC, RS-MMC, MMC micro, or eMMC), a secure digital (SD) card (e.g., SD, mini SD, micro SD, or SDHC), and a universal flash storage (UFS).

Figure 13:
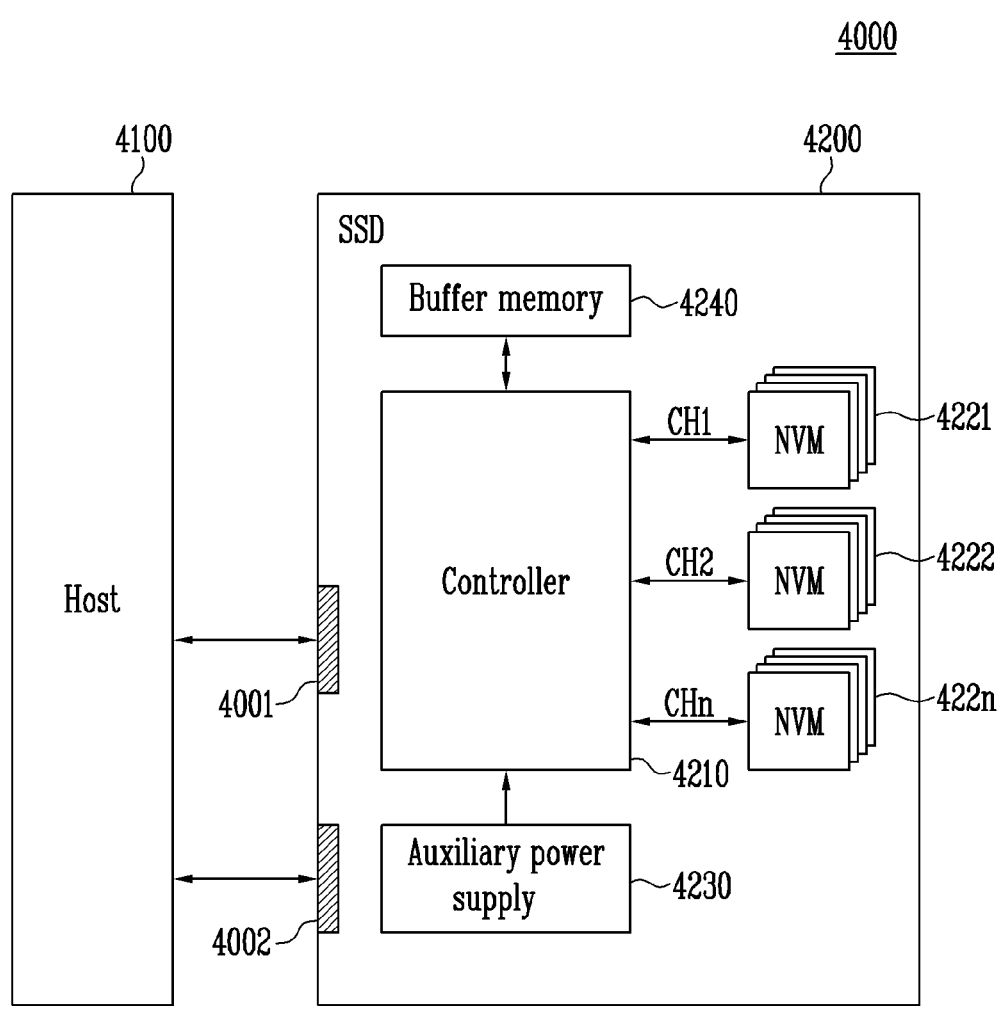
FIG. 13 is a diagram illustrating a solid state drive (SSD) system to which a power supply according to an embodiment of the present disclosure is applied.

FIG. 13 is a diagram illustrating a solid state drive (SSD) system 4000 to which a power supply according to an embodiment of the present disclosure is applied.

Referring to FIG. 13, the SSD system 4000 includes a host 4100 and an SSD 4200. The SSD 4200 exchanges a signal SIG with the host 4100 through a signal connector 4001 and receives power PWR through a power connector 4002. The SSD 4200 includes a controller 4210, a plurality of flash memories 4221 to 422n, an auxiliary power supply 4230, and a buffer memory 4240.

The controller 4210 may control the plurality of flash memories 4221 to 422n in response to the signal received from the host 4100. For example, the signal may be based on an interface between the host 4100 and the SSD 4200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 4230 may be implemented identically to the auxiliary power supply 2200 described with reference to FIG. 2. For example, the auxiliary power supply 4230 may be connected to the host 4100 through the power connector 4002 and may be charged by receiving power from the host 4100. The auxiliary power supply 4230 may provide power to the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store metadata (for example, a mapping table) of the flash memories 4221 to 422n. The buffer memory 4240 may include a volatile memory such as a DRAM, an SDRAM, a DDR SDRAM, and an LPDDR SDRAM, or a nonvolatile memory such as an FRAM, a ReRAM, an STT-MRAM, and a PRAM.

In the above-described embodiments, all operations may be selectively performed or skipped. In addition, the operations in each embodiment may not always be sequentially performed in given order, and may be randomly performed. Furthermore, the embodiments disclosed in the present specification and the drawings aim to help those with ordinary knowledge in this art to more clearly understand the present disclosure rather than aiming to limit the bounds of the present disclosure. In other words, one of ordinary skill in the art to which the present disclosure belongs will be able to easily understand that various modifications are possible based on the technical scope of the present disclosure and the following claims. Furthermore, the embodiments may be combined to form additional embodiments.

What is claimed is:

1. A power supply comprising:
   a main power supply configured to receive external power and output a charge voltage and main power; and
   an auxiliary power supply including a capacitor array configured to charge auxiliary power using the charge voltage and output the auxiliary power and a charge controller connected to the capacitor array through a charge line,
   wherein the charge controller is configured to perform a main charge check operation for checking whether the charge of the capacitor array is completed, and repeatedly perform a monitoring operation independently of the main charge check operation, until a detected voltage charged in the capacitor array reaches a target level,
   wherein the monitoring operation includes:
   a discharge operation to decrease a level of the charge voltage;
   a sub charge operation to increase the level of the charge voltage; and
   a detect operation to detect the detected voltage, and
   wherein the charge controller determines the monitoring operation as a failure when the charge voltage is less than the target level at a predetermined point in time.

2. The power supply of claim 1, wherein the auxiliary power supply further comprises:
   an operation device configured to:
   compare the detected voltage provided from the charge controller with the target level, and
   output a monitoring completion signal according to a result of the comparing.

3. The power supply of claim 2,
   wherein the operation device is further configured to generate a digital value corresponding to the detected voltage,
   wherein the operation device compares the detected voltage with the target level by comparing the digital value with a reference value corresponding to the target level, and
   wherein the operation device outputs the monitoring completion signal having a logic low value when the digital value is less than the reference value and outputs the monitoring completion signal having a logic high value when the digital value is greater than or equal to the reference value.

4. The power supply of claim 3, wherein the charge controller is further configured to:

periodically perform the monitoring operation while the monitoring completion signal has the logic low value, and stop the monitoring operation when the monitoring completion signal has the logic high value.

5. The power supply of claim 1, wherein the capacitor array includes a plurality of capacitor groups connected in parallel between the charge line and a ground terminal, and wherein each of the capacitor groups includes a plurality of capacitors.

6. The power supply of claim 5, wherein the plurality of capacitors are configured of polymer-tantalum capacitors.

7. The power supply of claim 1, wherein the charge controller comprises:

a power transfer circuit configured to transfer the detected voltage to the charge line; and a monitoring circuit configured to perform the discharge operation and the sub charge operation on the charge line.

8. The power supply of claim 7, wherein the monitoring circuit is further configured to perform the sub charge operation before or after the performing of the discharge operation.

9. The power supply of claim 7, wherein the charge controller further comprises:

a pass detector configured to compare the detected voltage with the target level and transfer the detected voltage to the operation device when the charging level reaches the target level.

10. The power supply of claim 9, wherein the monitoring circuit comprises:

a first counter configured to periodically output a discharge signal when the charging of the capacitor array is started; and a discharge circuit configured to discharge the charge line during a predetermined time whenever the discharge signal is output.

11. The power supply of claim 10, wherein the first counter is further configured to stop the output of the discharge signal when the detected voltage is increased to the target level.

12. The power supply of claim 9, wherein the pass detector comprises:

a charge detector configured to:

compare the charging level of the detected voltage with the target level when the charging of the capacitor array is started, output a count signal when the detected voltage is less than the target level, and transfer the detected voltage to the operation device when the detected voltage is increased to the target level; and a second counter configured to:

compare a current amount of time and a set amount of time in response to the count signal, and output a detection signal to the charge detector according to a result of the comparing of the current amount of time and the set amount of time.

13. The power supply of claim 12, wherein the second counter is configured to:

output the detection signal having a logic high value when the current amount of time is less than the set amount of time, and output the detection signal having a logic low value when the current amount of time is greater than or equal to the set amount of time.

14. The power supply of claim 13, wherein the charge detector is further configured to detect the detected voltage again when the detection signal has the logic high value.

15. The power supply of claim 1, further comprising a switch circuit configured to be activated after the auxiliary power charged in the auxiliary power supply is increased to the target level and configured to output, after activation, the auxiliary power instead of the main power when supply of the external power is cut off.

16. The power supply of claim 1, wherein, as the monitoring operation is repeatedly performed, a temperature of the capacitor array is increased.

17. The power supply of claim 1, wherein the charge controller is further configured to output the detected voltage when the detected voltage reaches the target level.

18. A method of operating a power supply including a capacitor array, the method comprising:

supplying a charge voltage to the capacitor array through a charge line;

performing a main charge check operation for checking whether the charge of the capacitor array is completed;

performing a monitoring operation, independently of the main charge check operation, repeatedly on the charge line until a detected voltage charged in the capacitor array reaches a target level; and determining the monitoring operation as a failure when the charge voltage is less than the target level at a predetermined point in time, wherein the monitoring operation includes:

a discharge operation to decrease a level of the charge voltage;

a sub charge operation to increase the level of the charge voltage; and a detect operation to detect the detected voltage.

19. The method of claim 18, wherein the sub charge operation comprises supplying the charge voltage to the capacitor array through the charge line by stopping the discharge operation.

* * * * *